Sept. 5, 1961     O. F. WEGENER     2,998,683
TOOL HOLDING AND SHARPENING DEVICE
Filed May 13, 1959
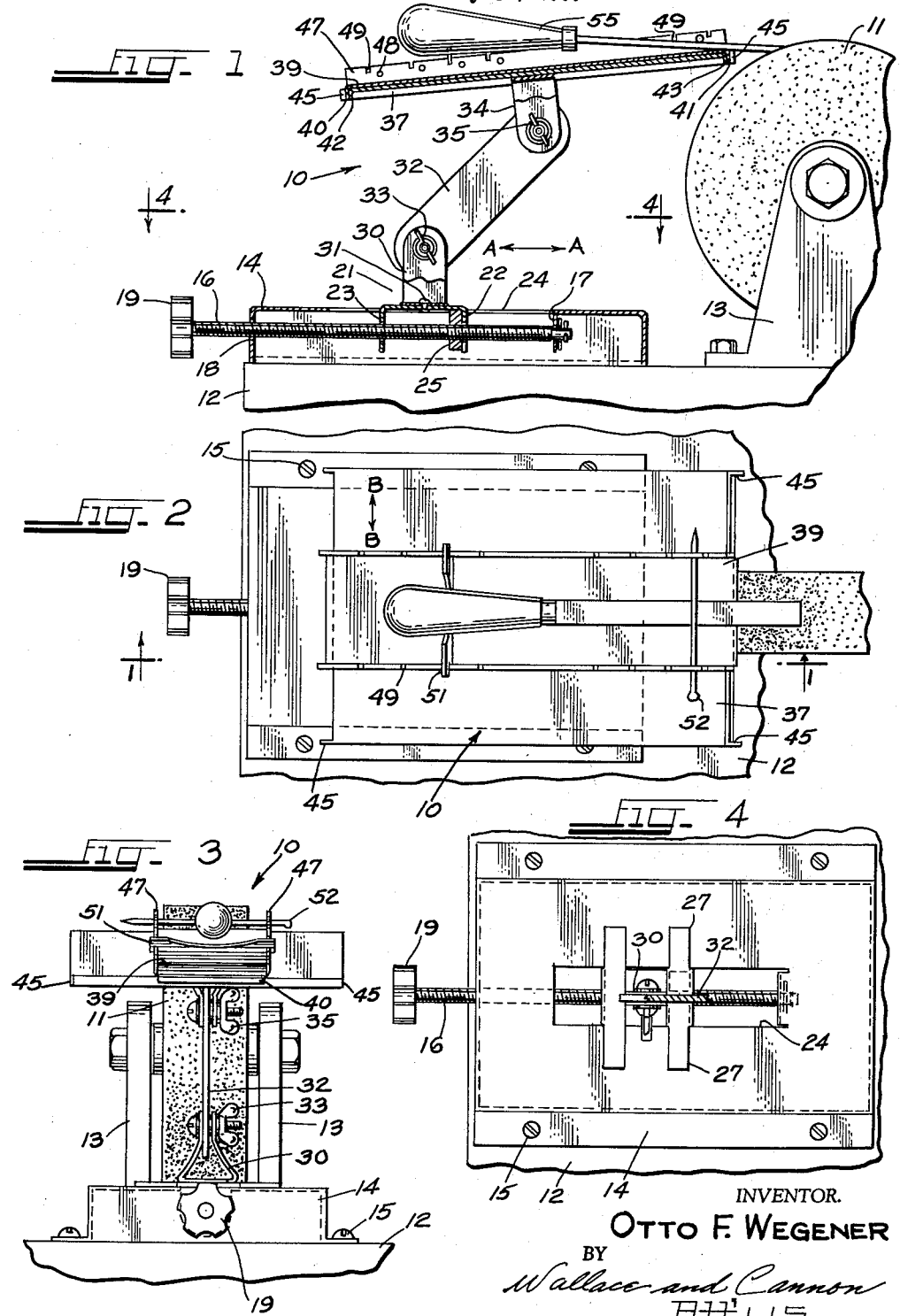
INVENTOR.
OTTO F. WEGENER
BY
Wallace and Cannon
ATTYS.

__United States Patent Office__

2,998,683
Patented Sept. 5, 1961

2,998,683
TOOL HOLDING AND SHARPENING DEVICE
Otto F. Wegener, 1701 Sedgwick St., Chicago, Ill.
Filed May 13, 1959, Ser. No. 813,007
4 Claims. (Cl. 51—216)

This invention relates to a tool holding and clamping device.

In sharpening and dressing small hand tools such as chisels, knives and so forth, it is desirable to have a clamping device that will hold the tool rigidly within the clamp structure. It is also desirable that the clamping device be effective to move the tool toward and away from a sharpening or grinding element. In the sharpening of knives and chisels, in particular, it may be desirable to move the tool along the periphery of the grinding element. To accommodate tools of varying size and configuration, it is also desirable to be able to adjust both the height and the angular inclination of the clamping device with respect to the grinding element. In general, however, the prior art mechanisms which have been constructed so as to obtain all of these desired characteristics have resulted in complex and costly apparatus. The cost and complexity of such devices is quite detrimental in many applications, particularly in home workshops and other instances where the tool holder is used only relatively infrequently.

It is an object of this invention, therefore, to provide a relatively simple but effective clamping arrangement for clamping a tool within a tool holding device.

It is another object of this invention to mount a tool support on a tool supporting platform in a manner which permits slidable movement of the carriage with respect to the platform and thus permits movement of the tool laterally along the surface of the periphery of the grinding element.

It is another object of this invention to provide an adjustable support which permits both the height and the angular adjustment of a tool clamp to be adjusted with respect to a grinding element.

It is another object of this invention to provide a carriage slidable within a base member of a tool holding device for permitting a tool clamping mechanism to be advanced and retracted toward and away from the grinding element.

It is another object to provide a tool holding device that will permit movements in a plurality of coordinate directions to be independently made.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a side elevation, partly in cross section, of a tool holder constructed in accordance with a preferred embodiment of the invention and taken approximately along the line 1—1 in FIG. 2;

FIG. 2 is a plan view of the tool holder shown in FIG. 1;

FIG. 3 is a rear elevation of the tool holder shown in FIG. 1; and

FIG. 4 is a plan view partly in section and taken approximately as indicated by the arrows 4—4 in FIG. 1.

As shown in FIGS. 1 and 3, the tool holder 10 may be used in conjunction with a rotary grinding element 11, which is shown mounted on a bed plate 12 by means of supporting brackets 13. The tool holder 10 comprises a base member 14 mounted on the bed plate and oriented in any predetermined manner by means of the screws 15. A lead screw 16 is mounted within the base member and is supported within a downwardly directed flange 17 and an aperture 18 formed in one wall of the base member. A knurled knob 19 is provided for rotating the lead screw. A lower carriage assembly 21 is slidably mounted upon the base member 14 within the confines of an elongated slot 24, and includes a pair of depending flanges 22 and 23 through which the lead screw 16 is passed. A threaded nut 25 is rigidly attached to the flange 22 and engages the threads of the lead screw 16 to reciprocate the carriage 21 in the direction of the arrows A as shown in FIG. 1, upon rotation of the lead screw within the base member.

As can be seen in FIG. 4 the carriage 21 includes a plurality of outwardly directed flange elements 27 disposed in sliding contact with the upper surface of the base member 14. These flange elements prevent tilting of the carriage 21 with respect to the base member. The lower carriage further includes a triangular bracket 30 which may be attached to the lower portion of the carriage by means of a rivet 31, as illustrated, or by any other suitable means. The innerfaces of the bracket 30 engage one end of a supporting link 32 and a wing nut assembly 33 is provided for varying the angular relationship of the link 32 with respect to the bracket 30. The upper end of the link 32 is adjustably connected to a bracket 34 by means of a similar wing nut assembly 35. The bracket 34 is rigidly attached to the under side of a rectangularly shaped support platform 37.

An upper carriage assembly 39 is mounted on the rectangular shaped tool support platform 37. The assembly 39 includes a pair of downwardly directed flanges 40 and 41 which engage corresponding ends 42 and 43, respectively, of the platform 37. The flanges 40 and 41 comprise guides for controlling the sliding movement of the carriage assembly on the platform. As illustrated in FIG. 2, the carriage assembly is free to slide laterally along the surface of the platform in the direction of the arrows BB. A series of stops 45 formed on the platform 37 limit the extent of the sliding movement of the carriage by engaging the flanges 40 and 41 of the carriage assembly.

The carriage assembly 39 includes two spaced side walls 47. The upwardly directed side walls 47 are provided with a series of pin guides comprising the spaced apertures 48 and with a series of slots 49 formed in the upper edges of the side walls. As can be seen in FIG. 2, an aperture and a slot in one side wall is in substantial alignment with the corresponding aperture and slot in the opposite side wall. A tool supporting element 51 is included in the tool holder 10 and can be removably inserted in any aligned pair of the slots 49; a holding pin 52 can be removably inserted in any aligned pair of apertures.

In operation, a tool such as a hand chisel 55 is placed so as to have its handle resting on the upper edge of the tool supporting element 51, which is suitably positioned within a pair of aligned slots 49. The blade of the tool engages the leading edge of the carriage assembly 39. The pin 52 is inserted through a suitable pair of apertures 48 so as to clamp the tool 55 rigidly with the carriage 39. The height and angular inclination of the tool and carriage 39 with respect to the grinding wheel 11 is then adjusted by means of the wing nuts 35 and 33. The leading edge of the tool 55 may then be engaged with the outer periphery of the grinding element 11 by rotating the lead screw 16 to advance the lower carriage 21, within the base member 14, toward the grinding wheel. The leading edge of the tool 55 may then be uniformly ground along its lateral extent by sliding the upper carriage 39 back and forth on the platform 37 as indicated by the arrows B—B.

Thus, the tool holder provides a very simple apparatus for rigidly clamping a tool within a carriage assembly and for moving the tool and carriage with respect to the grinding element in a plurality of directions. The tool may be moved laterally along the periphery of the grinding element while maintaining the edge of the tool in fixed engagement with the surface of the grinding element. It may be moved toward and away from the grinding element in a precisely controlled manner. The height and angular inclination of the tool with respect to the grinding element may be varied. Each of these movements may be made independently of the other.

The tool holder of this invention is especially suitable for use by the home craftsman, for, in addition to providing accurate control of all of the movements required of a tool holder used for sharpening most hand tools, the tool holder can be economically produced since the greater portion of the tool holder assembly may be constructed from sheet metal of suitable gauge.

Hence, while I have illustrated and described the preferred embodiments of my invention, it is to be understood that these are capable of variation and modification.

I claim:

1. A tool holder comprising, a base member, a platform member, adjustable means for supporting said platform member from said base member, reciprocatable carriage means mounted on said platform member, said carriage means comprising spaced side walls each having a series of slots located at spaced intervals in the upper edges thereof, said side walls each further having a series of pin guide apertures located at spaced intervals therein, the slots and guides in one side wall being aligned with the slots and guides in the opposite side wall, a supporting element for engaging the under surface of a tool removably mounted in one pair of aligned slots in said side walls, and a retaining pin for engaging an upper surface of a tool removably mounted in and extending between a pair of aligned pin guides in said side walls.

2. A tool holder comprising, a base member, a first carriage movably mounted on the base member for reciprocatory movement in one coordinate direction, a platform member, an adjustable support connecting the platform to the first carriage in fixed longitudinal alignment, a tool clamping carriage slidably mounted on the platform member, said tool clamping carriage having spaced side walls formed with a plurality of pin-receiving apertures and including a retaining pin removably insertable in a pair of said apertures for clamping a tool in said carriage, and guide means on the tool clamping carriage and platform member restricting the sliding movement of the carriage to reciprocatory motion in a coordinate direction transverse to the direction of motion of the first carriage.

3. A tool holder for holding a tool in position for dressing by a rotary grinding element, and comprising, a base member, means for mounting said base member in predetermined position relative to said rotary grinding element, a first carriage movably mounted within the base member, a lead screw mounted within the base member and operatively connected to the first carriage to advance and retract the first carriage toward and away from the rotary grinding element, a tool support platform, support means adjustable at two separate points connecting the first carriage and the platform so that two sides of the platform extend in a direction substantially perpendicular to the direction of motion of the first carriage within the base member, said two separate points of adjustment permitting both the distance and the angle of inclination between the base member and platform to be varied, a second carriage slidably mounted on the platform, the second carriage having flanges at opposite ends engaging corresponding ends of the platform to permit sliding movement of the second carriage in a direction transverse to the direction of movement of the first carriage within the base member, said second carriage comprising a pair of spaced side walls each including a series of pin guide apertures located at spaced intervals therein and each further including a series of mounting slots located at spaced intervals along the upper edges of the side walls, the slots and apertures in one side wall being aligned with the slots and apertures in an opposite side wall, a support element removably mounted in any pair of aligned mounting slots, and a pin removably mounted in any pair of apertures, the support element, pin, and one edge of the second carriage constituting a tool clamping device.

4. A tool holder adapted to hold a tool in position during grinding thereof comprising a support plate having a pair of upstanding walls on opposite sides of said plate, said walls having a plurality of pairs of aligned slots in the upper edge of said walls, a tool supporting plate removably mounted in a pair of said slots, said walls also having a pair of aligned holes adjacent one end of said walls, and a pin removably mounted in and extending between said pair of holes whereby a tool may be held in position with one part of the tool resting on said tool supporting plate and another part of said tool wedged underneath said pin and against an edge of said plate.

References Cited in the file of this patent

UNITED STATES PATENTS

| | | |
|---|---|---|
| 1,384,163 | Smith et al. | July 12, 1921 |
| 1,647,203 | Smith | Nov. 1, 1927 |
| 1,872,096 | Runshang | Aug. 16, 1932 |
| 1,915,247 | Holloway et al. | June 20, 1933 |
| 2,153,476 | Norman | Apr. 4, 1939 |